(12) United States Patent
Kang et al.

(10) Patent No.: US 8,967,596 B2
(45) Date of Patent: Mar. 3, 2015

(54) HIGH-CONCENTRATION OXYGEN-DISSOLVING APPARATUS USING ULTRASONIC WAVES

(76) Inventors: Hyung Won Kang, Seogwipo-si (KR); Dong Jun Kang, Seoul (KR)

( * ) Notice: Subject to any disclaimer, the term of this patent is extended or adjusted under 35 U.S.C. 154(b) by 465 days.

(21) Appl. No.: 13/497,196

(22) PCT Filed: Aug. 31, 2010

(86) PCT No.: PCT/KR2010/005875
§ 371 (c)(1),
(2), (4) Date: Mar. 20, 2012

(87) PCT Pub. No.: WO2011/034297
PCT Pub. Date: Mar. 24, 2011

(65) Prior Publication Data
US 2012/0181711 A1    Jul. 19, 2012

(30) Foreign Application Priority Data
Sep. 21, 2009  (KR) .................. 10-2009-0089131

(51) Int. Cl.
*B01F 3/04* (2006.01)
*B01F 5/04* (2006.01)
(Continued)

(52) U.S. Cl.
CPC ......... *B01F 3/04503* (2013.01); *B01F 3/04978* (2013.01); *B01F 5/0415* (2013.01);
(Continued)

(58) Field of Classification Search
USPC ............. 261/4, 5, 131, 140.1, 147, 149, 36.1, 261/37, 66, 76, 81, DIG. 48, DIG. 75
See application file for complete search history.

(56) References Cited

U.S. PATENT DOCUMENTS 6,264,174 B1 *  7/2001  Chang et al. .................... 261/29
6,284,293 B1 *  9/2001  Crandall et al. ................ 426/67
(Continued)

FOREIGN PATENT DOCUMENTS

JP    2007-185576    7/2007
JP    2009-056364    3/2009
(Continued)

OTHER PUBLICATIONS

International Search Report for PCT/KR2010/005875 mailed May 20, 2011.

*Primary Examiner* — Charles Bushey
(74) *Attorney, Agent, or Firm* — Andrus Intellectual Property Law, LLP

(57) ABSTRACT

The present invention relates to a high-concentration oxygen-dissolving apparatus using ultrasonic waves. More particularly, the present invention relates to a high-concentration oxygen-dissolving apparatus using ultrasonic waves in which, when liquid is introduced via an inlet port, a sediment filter filters out foreign substances, a pre-carbon filter filters out harmful chemical substances, a UF membrane filter filters out impurities, a post-carbon filter filters out gas components and odorous components, the filtered liquid is stored in a storage tank, the liquid stored in the storage tank passes through a cooling device to be cooled to a low temperature, the liquid compressed to high pressure by means of a high pressure pump and a Venturi tube is introduced into an ultrasonic wave irradiating unit, oxygen is dissolved into the liquid by ultrasonic waves irradiated from the ultrasonic wave irradiating unit, the liquid flows to the storage tank through a flow pipe, and the liquid having an oxygen concentration higher than a predetermined level is discharged through an outlet pipe.

4 Claims, 2 Drawing Sheets

(51) Int. Cl.
  *B01F 5/10* (2006.01)
  *B01F 11/02* (2006.01)
  *C02F 9/00* (2006.01)
  *C02F 1/28* (2006.01)
  *C02F 1/36* (2006.01)
  *C02F 1/44* (2006.01)

(52) U.S. Cl.
  CPC ............ *B01F 5/106* (2013.01); *B01F 11/0266* (2013.01); *C02F 9/00* (2013.01); *B01F 2003/04879* (2013.01); *C02F 1/281* (2013.01); *C02F 1/36* (2013.01); *C02F 1/444* (2013.01)
  USPC .................. 261/5; 261/149; 261/66; 261/76; 261/81

(56) References Cited

U.S. PATENT DOCUMENTS

| | | | | |
|---|---|---|---|---|
| 6,955,341 | B2* | 10/2005 | Liou | 261/64.1 |
| 6,962,654 | B2* | 11/2005 | Arnaud | 210/143 |
| 7,494,534 | B2* | 2/2009 | Fukagawa et al. | 96/168 |
| 8,641,018 | B2* | 2/2014 | Sonnenrein | 261/76 |
| 2001/0045673 | A1* | 11/2001 | Ogston et al. | 261/76 |
| 2007/0069403 | A1* | 3/2007 | Schletz et al. | 261/76 |
| 2007/0257381 | A1* | 11/2007 | Chuang | 261/76 |

FOREIGN PATENT DOCUMENTS

| | | |
|---|---|---|
| KR | 20-0274820 | 5/2002 |
| KR | 10-0584912 | 5/2006 |
| KR | 10-0694191 | 3/2007 |

\* cited by examiner

HIGH-CONCENTRATION OXYGEN-DISSOLVING APPARATUS USING ULTRASONIC WAVES

RELATED APPLICATIONS

This application is a 371 application of International Application No. PCT/KR2010/005875, filed Aug. 31, 2010, which in turn claims priority from Korean Patent Application No. 10-2009-0089131, filed Sep. 21, 2009, each of which is incorporated herein by reference in its entirety.

TECHNICAL FIELD

The present invention relates to a high-concentration oxygen-dissolving apparatus using ultrasonic waves, and in particular to a high-concentration oxygen-dissolving apparatus using ultrasonic waves which is characterized in that when liquid is inputted into an inlet port, a sediment filter filters foreign substances, and a pre carbon filter filters a harmful chemical substance, and a UF (Ultra Filtration) membrane filters impurities, and a post carbon filter filters gas components and smell components. The thusly filtered liquid is stored in a storing tank, and the liquid of the storing tank is cooled to a low temperature while passing through a cooling apparatus, and the liquid compressed to a high pressure is inputted into an ultrasonic projection part by way of a high pressure pump and a Venturi tube, and oxygen is dissolved into the liquid with the aid of ultrasonic waves, and the liquid flows into the storing tank, and when the liquid contains a certain concentration of oxygen, the liquid is discharged through a discharge tube.

BACKGROUND ART

Oxygen is a necessary element in the life of human. When our bodies lack oxygen, some problems occur in the functions of bodies, sometimes causing various diseases.

For example, headache, vomiting, breathing increase, pulse rate increase, fatigue, dizziness or something occurs. In worse case, convulsion and athymia occurs, and it causes a death. Since the immunity system of a human body is destroyed, the human body can be easily infected with bacteria or viruses, thus consequently causing various diseases.

Water existing in the nature has a certain amount of oxygen in a dissolved form. The dissolved saturation level might vary depending on the temperature of water; however the dissolved oxygen concentration under a room temperature atmosphere is about 6 ppm to 8 ppm. The dissolved oxygen in water necessarily exists in terms of plants and life as a prerequisite essential. When dissolved oxygen is less than 2 ppm, both plants and life die.

For this reason, there is a lot of interests in oxygen water known to have a lot of contents of oxygen as compared with a common water.

The dissolved oxygen contained in oxygen water is absorbed into blood by way of stomach and is circulated to each cell tissue by a blood circulation operation and is used as an energy needed for metabolism. The dissolved oxygen taken by drinking oxygen water is absorbed into each cell tissue more than 10 times faster than the oxygen which is taken by way of lungs, which might has a little difference depending on the partial pressure of oxygen in a human body. As the concentration of oxygen in oxygen water is higher, the amount of oxygen to be absorbed into a human body much more increases.

For example, the concentration of oxygen in the air in a forest which provides a woods bathing is 1% or 2% higher than 21% of a typical oxygen concentration; however the freshness that a human body feels is great. So, it is obvious that the effects by oxygen water might be great, which might not be compared with the effects by woods bathing.

It is needed to dissolve oxygen into water so as to manufacture oxygen water having more oxygen contents than a typical water. As a typical way of dissolving oxygen into water, oxygen is spread into water in a form of fog by using air stone generally used in an aquarium; however it is almost hard to quickly dissolve and produce oxygen water with a high concentration due to a physical limit.

Alternatively, there is a way of dissolving more oxygen into water by filling oxygen into a tank with water at a high pressure based on the Henry's law that the mass of the gas dissolved in liquid is in proportion to the pressure of gas.

However, it is impossible to dissolve the oxygen with a concentration higher than a certain level, and it takes long to dissolve oxygen.

DISCLOSURE OF INVENTION

Accordingly, the present invention is made to resolve the above problems, and it is an object of the present invention to provide a high-concentration oxygen-dissolving apparatus using ultrasonic waves which makes it possible to dissolve, at a high concentration, oxygen into a liquid passing through a ultrasonic wave projection part by installing a ultrasonic wave projection part at a flow tube connected to a Venturi tube when liquid is discharged from a storing tank by way of a discharge tube and is inputted into a storing tank by way of a flow tube at a high pressure through a high pressure pump and a Venturi tube.

To achieve the above objects, there is provided when liquid is inputted into an inlet port, a sediment filter filters foreign substances, and a pre carbon filter filters a harmful chemical substance, and a UF membrane filters impurities, and a post carbon filter filters gas components and smell components. The thusly filtered liquid is stored in a storing tank, and the liquid of the storing tank is cooled to a low temperature while passing through a cooling apparatus, and the liquid compressed to a high pressure is inputted into an ultrasonic projection part by way of a high pressure pump and a Venturi tube, and oxygen is dissolved into the liquid with the aid of ultrasonic waves, and the liquid flows into the strong tank, and when the liquid contains a certain concentration of oxygen, the liquid is discharged through a discharge tube,

Advantageous Effects

The present invention has advantageous effects in quickly dissolving a high concentration of oxygen into liquid in such a way to dissolve, at a high concentration, oxygen into a liquid passing through a ultrasonic wave projection part by installing a ultrasonic wave projection part at a flow tube connected to a Venturi tube when liquid is discharged from a storing tank by way of a discharge tube and is inputted into a storing tank by way of a flow tube at a high pressure through a high pressure pump and a Venturi tube.

The features and advantages of the present invention will be more clear with the following detailed descriptions with reference to the accompanying drawings. The terms or words used in the specification and claims should not be interpreted on a conventional and dictionary basis, but should be interpreted based on the meaning and concept well matching with the technical concepts of the present invention with a prin-

MODES FOR CARRYING OUT THE INVENTION

Figure 1:
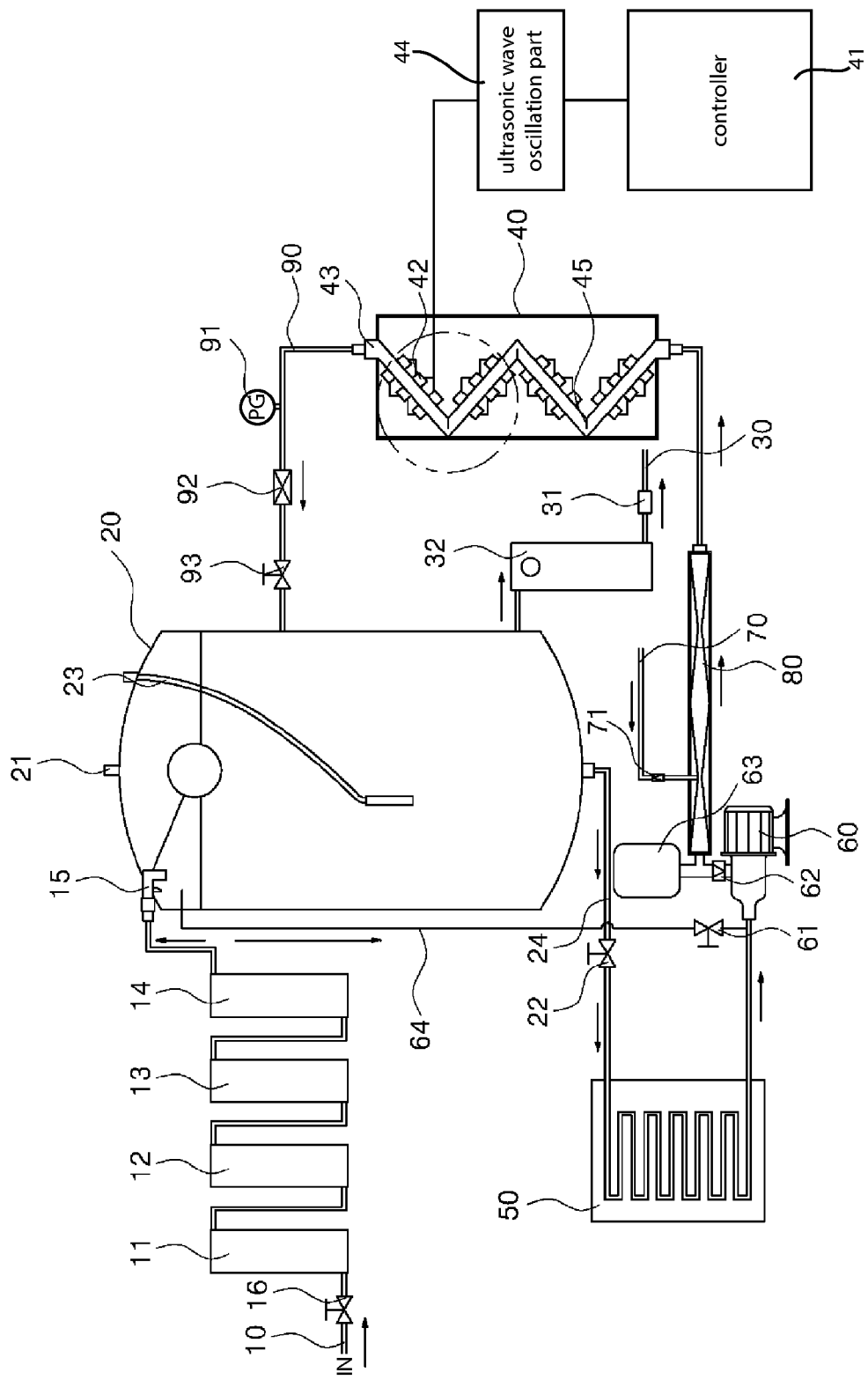
FIG. 1 is a view illustrating the entire construction of a high-concentration oxygen-dissolving apparatus using ultrasonic waves according to the present invention.
Figure 2:
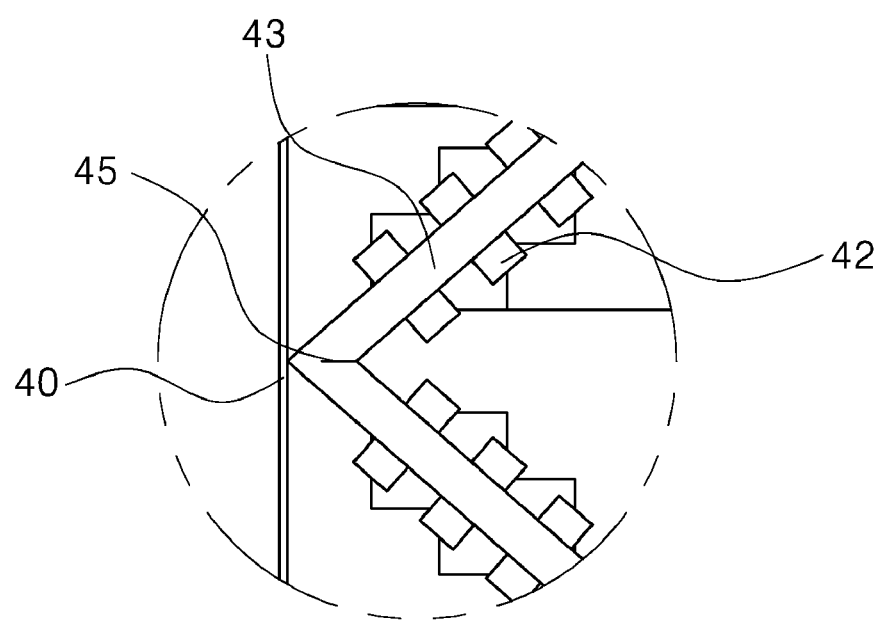
FIG. 2 is an enlarged view of an ultrasonic wave projection part of a high-concentration oxygen-dissolving apparatus using ultrasonic waves according to the present invention.

In the high-concentration oxygen-dissolving apparatus using ultrasonic waves in an apparatus dissolving a high concentration of oxygen into liquid, there are provided an inlet port 10 which receives liquid and has an inflow adjusting valve 16; a sediment filter 11 filtering foreign substances contained in the liquid flowing in through the inlet part 10; a pre carbon filter 12 connected with the sediment filter 11 for filtering a harmful chemical substance contained in the liquid; an UF membrane filter 13 connected with the pre carbon filter 12 for filtering impurities dissolved in the liquid; a post carbon filter 14 connected with the UF membrane filter 13 for filtering gas components and smell components, an injection port 15 connected with the post carbon filter 14 for injecting liquid into the storing tank 20 which stores liquid and having a water level adjusting part which constantly adjusts the level of liquid; a temperature adjusting part 21 installed at an outer side of the storing tank 20 for setting the temperature of the storing tank 20; a D.O (Dissolved Oxygen) meter 23 installed in the interior of the storing tank 20 for measuring the amount of oxygen dissolved in the liquid of the storing tank 20; a discharge tube 24 which is installed at a lower side of the storing tank 20 and has a discharge valve 22 through which the liquid of the storing tank 20 is discharged, thus adjusting the amount of the discharging liquid; a cooling apparatus 50 cooling the liquid to a low temperature when the liquid discharged through the discharge tube 24 passes; a high pressure pump 60 which transfers the liquid cooled in the cooling apparatus 50; an over oxygen return tube 64 connected with the high pressure pump 60 and the upper side of the storing tank 20 for inputting over oxygen, which is not dissolved in the storing tank 20, into the high pressure pump 60; a Venturi tube 80 connected with the high pressure pump 60 for discharging the liquid which is discharged from the high pressure pump 60; a pressure adjusting part 63 installed between the Venturi tube 80 and the high pressure pump 60 for adjusting the pressure of the liquid; an oxygen injection tube 70 connected with the Venturi tube 80 for injecting oxygen; an ultrasonic wave projection part 40 connected with the outlet port of the Venturi tube 80 and enhances the solubility of the oxygen and liquid by projecting ultrasonic waves toward the passing liquid and helps the passed-by liquid to flow into the storing tank 20; a flow tube 90 connected between the ultrasonic wave projection part 40 and the storing tank 20 and has a liquid pressure gauge 91, a decompression valve 92 and a flow adjusting valve 93; and a discharge tube 30 which is installed at a lower side of the storing tank 20 and discharge liquid to the outside after measuring the concentration of the oxygen dissolved in the liquid using the D.O meter and has an ozone filter 32 for filtering ozone contained in the liquid and a solenoid valve 31 for opening and closing the liquid discharged.

The ultrasonic wave projection part 40 comprises a transfer tube 43 which is formed in a zigzag shape for transferring liquid; a plurality of ultrasonic wave oscillators 42 which are installed at an outer side of the transfer tube 43 for projecting ultrasonic waves toward the transfer tube 43; an ultrasonic wave oscillation part 44 which is connected with the ultrasonic wave oscillator 42 and is installed at an outer side of the ultrasonic wave projection part 40 for thereby oscillating ultrasonic waves; and a controller 41 connected with the ultrasonic wave oscillation part 44 for thereby controlling the ultrasonic wave oscillation part 44.

The transfer tube 43 includes a resistance protrusion 45 at a bent inner portion for interfering with the moving of the liquid.

A first check valve 62 is connected between the high pressure pump 60 and the Venturi tube 80 for preventing the liquid from reversely flowing through the Venturi tube 80, and a second check valve 71 is connected between the oxygen injection tube 70 and the Venturi tube 80 for preventing the liquid of the Venturi tube 80 from flowing in a reverse direction.

The prevent invention will be described in more details.

When liquid is inputted through the inlet port 10 designed to receive liquid, the sediment filter 11 filters foreign substances, and the pre carbon filter 12 filters a harmful chemical substance, and the UF membrane filter 13 filters impurities, and the post carbon filter 14 filters gas components and smell components. The liquid is injected into the interior of the storing tank 20 through the injection port 15 with a water level adjusting apparatus. When the liquid of the storing tank 20 is discharged through the discharge tube 24 formed at a lower side of the storing tank 20, the temperature of the liquid is cooled by the cooling apparatus 50, and the liquid is flown to the high pressure pump 60.

An over oxygen return to be 64 is installed between the high pressure pump 60 and the upper side of the storing tank 20, so the oxygen not dissolved in the storing tank 20 is inputted into the high pressure pump 60 and is transferred to the Venturi tube 80 along with liquid.

Oxygen is injected into the Venturi tube 80 with the aid of the oxygen injection tube 70 disposed at the Venturi tube 80, and the provision of the second check valve 71 connected between the oxygen injection tube 70 and the Venturi tube helps prevent the liquid of the Venturi tube 80 from reversely flowing into the oxygen injection tube 70, and the pressure adjusting part 63 is installed between the high pressure pump 60 and the Venturi tube 80, thus adjusting the pressure of the interior of the Venturi tube 80. A first check valve 62 is installed between the pressure adjusting part 63 and the high pressure pump 60 for thereby preventing the liquid of the Venturi tube from reversely flowing.

The liquid compressed to a high pressure while passing through the Venturi tube 80 passes through the ultrasonic wave projection part 40 and is transferred into the interior of the storing tank 20 again by way of the flow tube 90 with the liquid pressure gauge 91, the decompression valve 92 and the flow adjusting valve 93 installed therein.

The ultrasonic wave projection part 40 comprises a transfer tube 43 which is formed in a zigzag shape for transferring liquid; a plurality of ultrasonic wave oscillators 42 which are installed at an outer side of the transfer tube 43 for projecting ultrasonic waves toward the transfer tube 43; an ultrasonic wave oscillation part 44 which is connected with the ultrasonic wave oscillator 42 and is installed at an outer side of the ultrasonic wave projection part 40 for thereby oscillating ultrasonic waves; and a controller 41 connected with the ultrasonic wave oscillation part 44 for thereby controlling the ultrasonic wave oscillation part 44.

The liquid passing through the ultrasonic wave projection part 40 with the above construction passes through the transfer tube 43 along with oxygen, and ultrasonic waves generated from the ultrasonic wave oscillation part 44 are applied to the transfer tube 43 through the oscillator 42, so oxygen is dissolved into liquid, and the liquid with oxygen dissolved therein is transferred into the interior of the storing tank 20 through the flow tube 90 connected with the ultrasonic wave projection part 40.

The resistance protrusion 45 is formed in the interior of the bent part of the transfer tube 43 formed in a zigzag shape for allowing the liquid to stay longer in the interior of the ultrasonic wave projection part 40 by interfering with the flow of liquid.

The D.O meter 23 is installed in the interior of the storing tank 20 so as to measure the concentration of oxygen dissolved the liquid. When the oxygen dissolved in the liquid exceeds a certain set value, it is discharged through the discharge tube 30 formed at a lower side of the storing tank 20, and the liquid passes through the ozone filter 32 installed at the discharge tube 30, thus filtering and discharging the ozone formed as oxygen is over-coupled.

The temperature adjusting part 21 is installed at the upper side of the storing tank 20 for adjusting the temperature in the interior of the storing tank 20, thus keeping the temperature of the liquid constant as the temperature of the storing tank 20 is made constant.

The invention claimed is:

1. A high-concentration oxygen-dissolving apparatus using ultrasonic waves in an apparatus dissolving a high concentration of oxygen into liquid, comprising:
   an inlet port (10) which receives liquid and has an inflow adjusting valve (16);
   a sediment filter (11) filtering foreign substances contained in the liquid flowing in through the inlet part (10);
   a pre carbon filter (12) connected with the sediment filter (11) for filtering a to harmful chemical substance contained in the liquid;
   an UF (Ultra Filtration) membrane filter (13) connected with the pre carbon filter (12) for filtering impurities dissolved in the liquid;
   a post carbon filter (14) connected with the UF membrane filter (13) for filtering gas components and odor components;
   an injection port (15) connected with the post carbon filter (14) for injecting liquid into the storing tank (20) which stores liquid and having a water level adjusting part which constantly adjusts the level of liquid;
   a temperature adjusting part (21) installed at an outer side of the storing tank (20) for setting the temperature of the storing tank (20);
   a D.O. (Dissolved Oxygen) meter (23) installed in the interior of the storing tank (20) for measuring the amount of oxygen dissolved in the liquid of the storing tank (20);
   a discharge tube (24) which is installed at a lower side of the storing tank (20) and has a discharge valve (22) through which the liquid of the storing tank (20) is discharged, thus adjusting the amount of the discharging liquid;
   a cooling apparatus (50) cooling the liquid to a low temperature when the liquid discharged through the discharge tube (24) passes;
   a high pressure pump (60) which transfers the liquid cooled in the cooling apparatus (50);
   an over oxygen return tube (64) connected with the high pressure pump (60) and the upper side of the storing tank (20) for inputting over oxygen, which is not dissolved in the storing tank (20), into the high pressure pump (60);
   a Venturi tube (80) connected with the high pressure pump (60) for discharging the liquid which is discharged from the high pressure pump (60);
   a pressure adjusting part (63) installed between the Venturi tube (80) and the high pressure pump (60) tot adjusting the pressure of liquid;
   an oxygen injection tube (70) connected with the Venturi tube (80) for injecting oxygen;
   an ultrasonic wave projection part (40) connected with the outlet port of the Venturi tube (80) and enhances the solubility of the oxygen and liquid by projecting ultrasonic waves toward the passing liquid and helps the passed-by liquid to flow into the storing tank (20);
   a flow tube (90) connected between the ultrasonic wave projection part (40) and the storing tank (20) and has a liquid pressure gauge (91), a decompression valve (92) and a flow adjusting valve (93); and
   a discharge tube (30) which is installed at a lower side of the storing tank (20) and discharges liquid to the outside after measuring the concentration of the oxygen dissolved in the liquid using the D.O. meter and has an ozone filter (32) for filtering ozone contained in the liquid and a solenoid valve (31) for opening and closing the liquid discharge.

2. A high-concentration oxygen-dissolving apparatus using ultrasonic waves according to claim 1, wherein said ultrasonic wave projection part (40) comprises:
   a transfer tube (43) which is formed in a zigzag shape for transferring liquid;
   a plurality of ultrasonic wave oscillators (42) which are installed at an outer side of the transfer tube (43) for projecting ultrasonic waves toward the transfer tube (43);
   an ultrasonic wave oscillation part (44) which is connected with the ultrasonic wave oscillator (42) and is installed at an outer side of the ultrasonic wave projection part (40) for thereby oscillating ultrasonic waves; and
   a controller (41) connected with the ultrasonic wave oscillation part (44) for thereby controlling the ultrasonic wave oscillation part (44).

3. A high-concentration oxygen-dissolving apparatus using ultrasonic waves according to claim 2, wherein said transfer tube (43) includes a resistance protrusion (45) at a bent inner portion for interfering with the moving of the liquid.

4. A high-concentration oxygen-dissolving apparatus using ultrasonic waves of claim 1, wherein a first check valve (62) is connected between the high pressure pump (60) and the Venturi tube (80) for preventing the liquid from reversely flowing through the Venturi tube (80), and a second check valve (71) is connected between the oxygen injection tube (70) and the Venturi tube (80) for preventing the liquid of the Venturi tube (80) from flowing in a reverse direction.

* * * * *